Nov. 5, 1957

R. S. STRIMEL 2,812,229

RECORDING DEVICE FOR USE IN CONJUNCTION WITH TESTING MACHINE

Filed Dec. 12, 1951

INVENTOR
Robert S. Strimel
Synnestvedt & Lechner
ATTORNEYS

Nov. 5, 1957  R. S. STRIMEL  2,812,229
RECORDING DEVICE FOR USE IN CONJUNCTION
WITH TESTING MACHINE
Filed Dec. 12, 1951  5 Sheets-Sheet 2

INVENTOR
Robert S. Strimel
Synnestvedt & Lechner
ATTORNEYS

United States Patent Office 2,812,229
Patented Nov. 5, 1957

2,812,229

RECORDING DEVICE FOR USE IN CONJUNCTION WITH TESTING MACHINE

Robert S. Strimel, Bridgeport, Pa., assignor to Tinius Olsen Testing Machine Company, Willow Grove, Pa., a corporation of Pennsylvania Application December 12, 1951, Serial No. 261,239

11 Claims. (Cl. 346—32)

This invention relates to a system for the measurement and registering of strain in an article which is being stressed in tension, compression or flexure.

In the preferred form the invention contemplates a drum having a recording chart thereon, the drum being rotatable in accordance with the strain in the article. The drum is driven by means of a two-phase electric motor, one phase being energized from a 60 cycle source, while the other phase, which controls the operation of the motor, is energized through a null circuit.

The null circuit comprises a unique arrangement of differential transformers, the secondary windings of which are arranged in series opposition. The resultant voltage from these windings is fed to an amplifier which energizes the controlling phase of the motor. In this circuit a signal transducer or differential transformer is associated with the article to be stressed by means of an extensometer with one end of the strain following arm abutting the article, while the other end is connected to the core of the transformer and movable in accordance with the movement of the arm. Thus, the voltage developed across the secondary windings is proportioned to the strain in the article. The secondary windings of this transformer are connectible in series opposition to the secondary windings of any of a plurality of other balancing differential transformers by means of a selector switch.

The cores of these latter transformers are mechanically interlinked with an operating cam attached to the shaft of the drum and rotatable therewith. The linkage provides for each core to move a different amount for a given angular rotation of the cam. Thus, the voltages developed across these secondary windings are proportioned to the angular position of the drum and are different for any cam position. The use of a plurality of these transformers provides several ranges or magnifications of strain indication.

The secondary winding of a zeroing transformer whose core may be manually operated is also connected in the null circuit in series opposition to the signal transformer. This unit provides a simple means for making a zero adjustment of the recorder drum.

The apparatus of the invention is particularly adaptable to stress-strain analysis work, especially in connection with the stress-strain curves. The present apparatus may be used with a testing machine such as disclosed in my copending application, Serial No. 230,877 filed June 11, 1951 and entitled, "A Registering System for Use in Conjunction with Testing Machines." In such cases a rack connected with the stress indicating mechanism moves a writing pen or pencil across the recorder drum to produce a stress-strain curve.

One object of the present invention is to provide a simple and reliable system for measuring and registering strain in an article under stress.

Another object of the invention is to provide a strain registering system wherein the strain indication may be magnified by a mere switching operation.

Another object of the invention is to provide a system wherein magnification of the strain may be accomplished without the necessity of gear changing or the like.

Another object of the invention is to provide a system wherein a change in magnification may be accomplished without stopping the testing run.

Another object of the invention is to provide a strain measuring and registering system that is wholly independent of inaccuracies due to gear backlash or the like.

How these objectives are accomplished will be apparent from the description and drawings wherein.

Figures 1, 2:
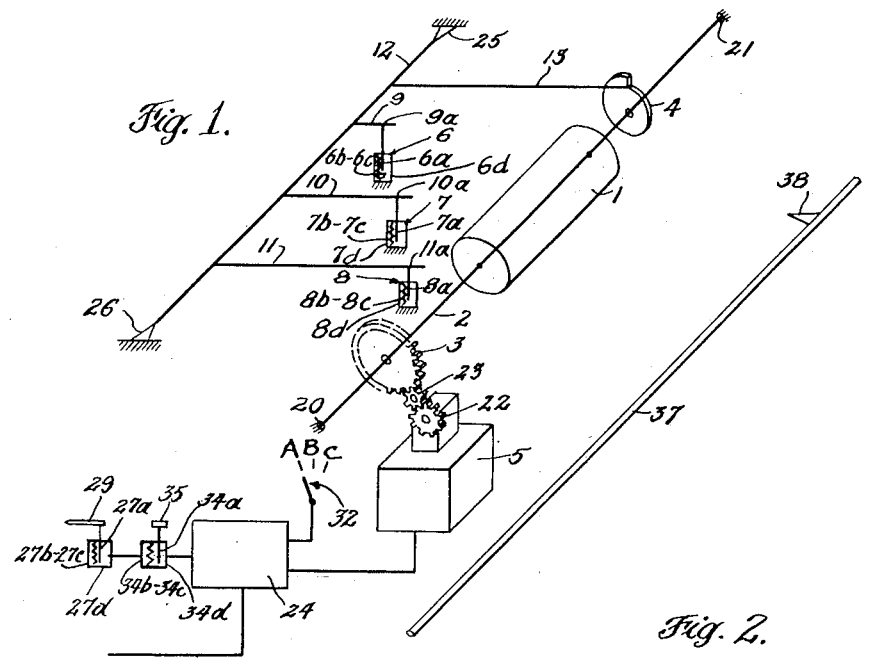
Figure 1 is a schematic view illustrating certain components of the invention.
Figure 2 is a schematic wiring diagram of the electrical system of the invention.
Figure 4:
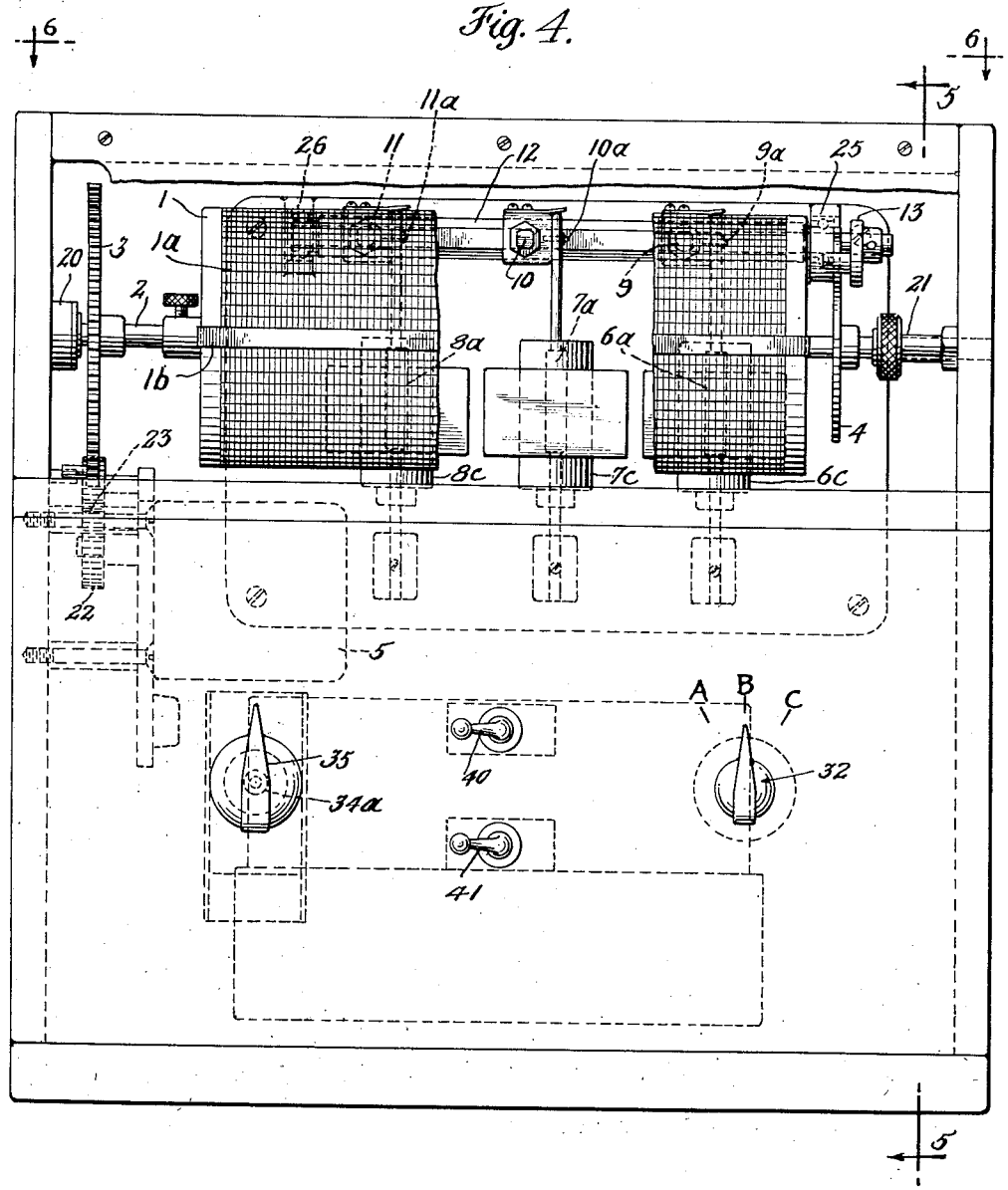
Figure 4 is a front elevation view illustrating the general arrangement of certain components of the invention.
Figure 5:
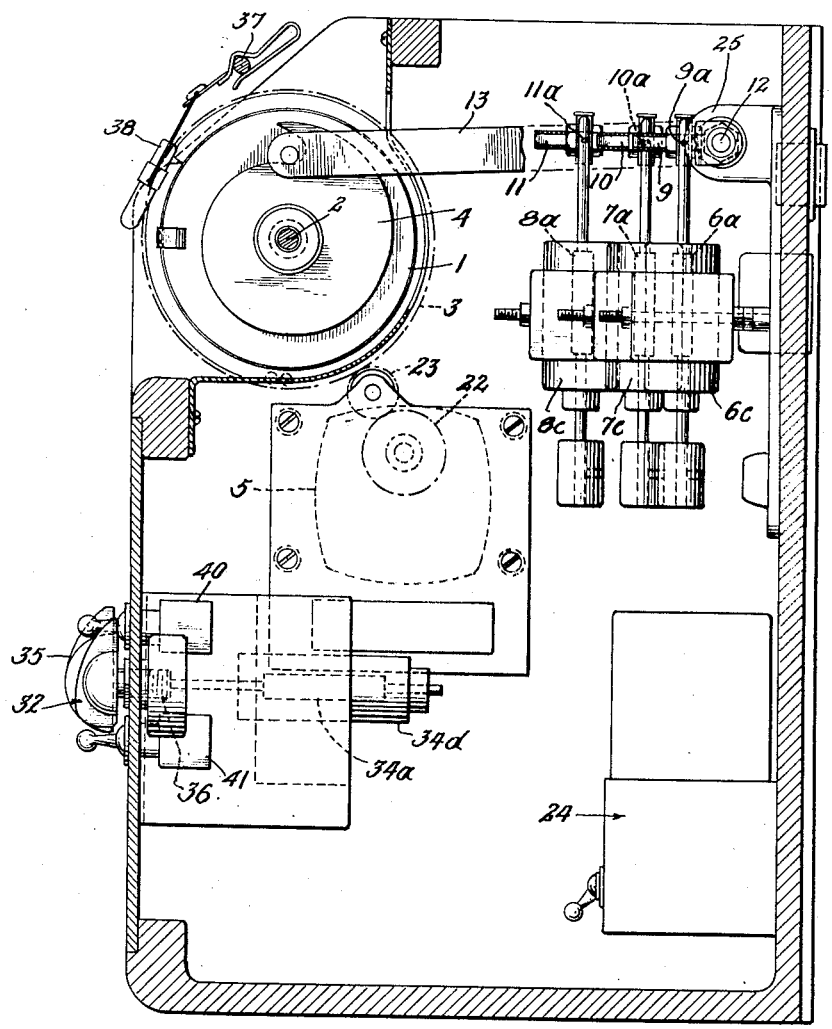
Figure 5 is a view taken along the lines 5—5 on Figure 4.
Figure 6:
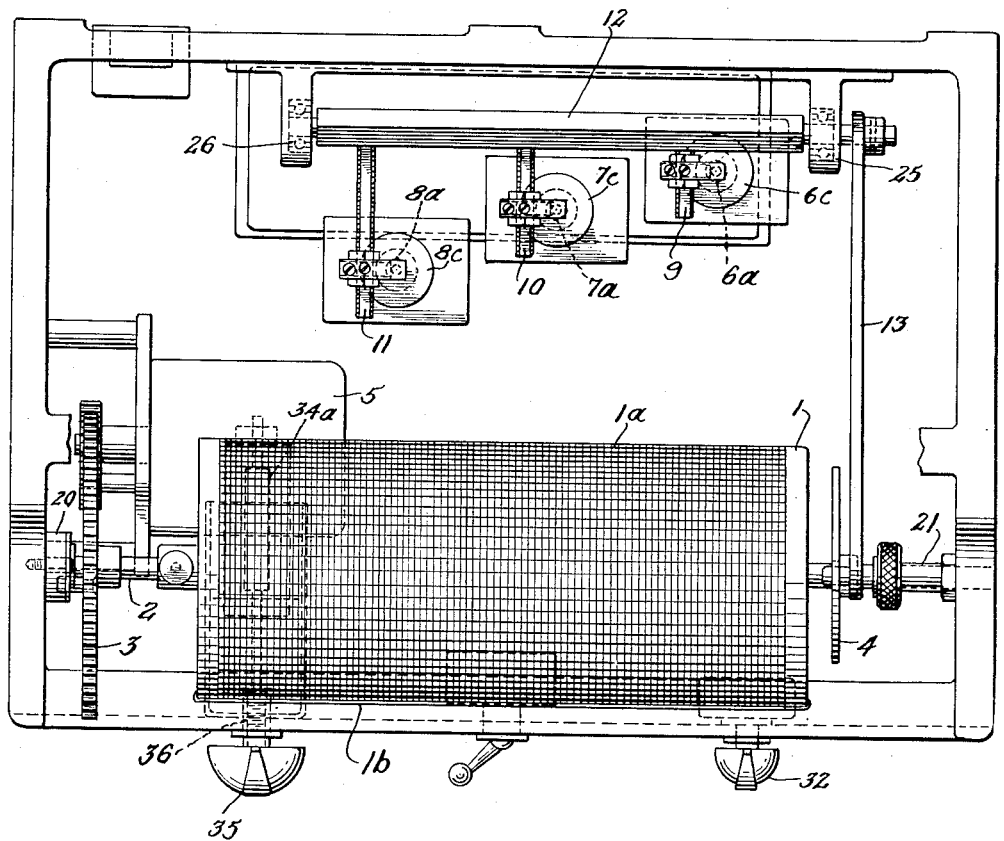
Figure 6 is a view taken along the lines 6—6 on Figure 4.

In Figure 1 the recorder drum 1 is mounted on shaft 2 rotatably supported by pivots 20 and 21. The drum is provided with chart paper 1a secured thereon by clip 1b (Figure 4). Driven gear 3 and cam 4 are also mounted on shaft 2. A two-phase servomotor 5 drives recorder drum through pinion 22, idler 23 and driven gear 3 according to signals received from an amplifier 24.

Cam follower 13 is rigidly attached to shaft 12 which is rotatably supported by pivots 25 and 26. Operating arms 9, 10 and 11 are also rigidly attached to shaft 12 and rotates therewith. The moving cores 6a, 7a and 8a of differential transformers 6, 7 and 8 are attached by pivot arrangements 9a, 10a and 11a to the respective operating arms 9, 10 and 11 at desired ratios or distances. The primary windings 6b, 7b and 8b are secondary windings 6c, 7c and 8c are fixedly secured within stationary porcelain housings 6d, 7d and 8d. As cam 4 rotates, the cores of the differential transformers 6, 7 and 8 move upwardly or downwardly and are positioned inside of the transformers, in direct proportion to their respective distances. Thus the voltage produced by a transformer is proportional to its radial distance from shaft 12. Therefore, the respective displacements of the cores are different for any given angular position of the cam, drum or motor shaft. Since the cores regulate the voltage developed, the degree of regulating effect differs for any given angular movement or position of the cam, etc.

Figure 3:
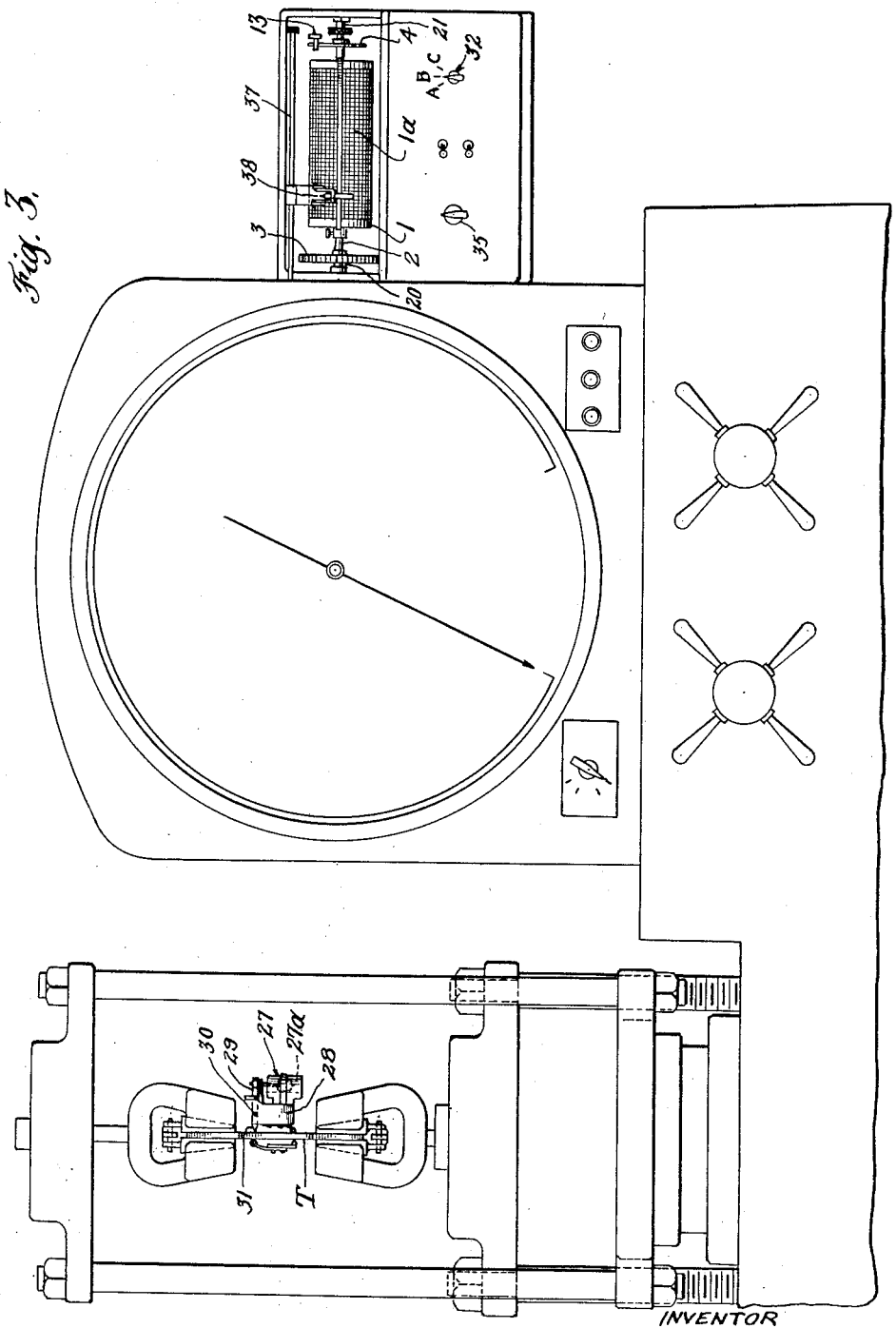
Figure 3 is a front view illustrating certain components of the invention as used with a testing machine.

As seen in Figure 3, the signal differential transformer 27 is secured to a test article T by an extensometer 28. The core 27a of the transformer is secured to the operating arm 29, pivoted at 30, the knife edge 31 of which abuts the test article. The primary winding 27b and the secondary winding 27c are fixedly secured within the stationary housing 27d. The operating arm 29 moves in accordance with the strain in the article and imparts a movement to the core which is proportional to the strain.

As mentioned above, the invention here preferably contemplates the use of differential transformers which are of the usual construction, for example as shown in Patent 2,568,587. The secondary windings of a transformer are arranged so that the output voltage is zero when the core is at the mid-point with the magnitude of the output voltage increasing as the core is moved off either side of the mid-point and there being a 180° phase shift of the output voltage as between positioning the core either side of the mid-point.

The signal differential transformer 27 may be selectively interconnected to the differential transformer 6, 7 or 8 by means of switch 32.

The resultant voltage is amplified by the amplifier 24 into a usable signal to rotate the motor 5. Cam 4 rotates until an electrical balancing signal is produced in the proper differential transformer (6, 7 or 8 as selected) and the motor stops. In other words, the voltage of the signal transformer 27 and the signal from the transformer 6, 7 or 8 are out of phase, the movement of the core of the transformer 6, 7 or 8 adjusting the magnitude of the voltage until it is equal to that of the transformer 27. Thus the drum 1 upon which the chart is recorded rotates an amount which is equal to the electrical signal which caused the motor to rotate. If the signal keeps increasing, the drum keeps rotating, because the cam is continuously repositioning the core of the selected balancing differential transformer.

When one differential transformer has been selected and then the switch 32 is turned to select another, the drum will automatically position itself accordingly and establish the drum in a position which is directly proportional to the ratio of the distances of the cores from the shaft 12. This switching may be done at any time, i. e., at zero signal or any time that an activating signal is being produced.

Gear backlash does not affect drum rotation whatsoever as the drum shaft is positioned by the cam and signal balancing differential transformers 6, 7 or 8.

The zero setter 34 is a differential transformer electrically arranged in series with the signal transducer in such a manner that mechanically adjusting its core effects a simple zero adjustment of the recorder drum.

Zero adjustment is desired because the signal transformer may not always be placed on a test specimen so that the core 27a is at the mid-point or zero output position at the start of a test. Hence with an error signal the drum may be driven slightly off the zero position.

This transformer is constructed in a manner similar to the transformer mentioned above. The core 34a is axially movable inwardly and outwardly by manipulating knob 35 controlling a nut and screw arrangement indicated at 36. The primary windings 34b and secondary windings 34c are fixedly secured within the stationary housing 34d.

The core of transformer 34 can be moved to either side of the zero voltage point of the transformer, and therefore, the phase of its voltage can be changed or shifted with respect to the phase of the voltage of the signal transformer 27. In the usual case the core will be adjusted to produce a voltage in opposition to the voltage from the signal transducer and that the drum will be driven to the zero position.

The switch 32 is marked A position, B position, C position etc. depending upon the number and arrangement of differential transformers 6, 7, 8 etc. Therefore any signal producing transmitter which is similarly coded and marked along with an explanation as to what the code means provides an ingenious and simple method of determining chart values.

When this recorder is used in conventional testing machines, which measure and indicate stress, a rack 37 from the load indicator moves a writing pen or pencil 38 across the drum chart 1a parallel to the recorder shaft 2. Such an arrangement is shown in my copending application, Serial No. 230,877, mentioned heretofore and also in my copending application, Serial No. 425,829, filed April 27, 1954 and entitled, "Driving Mechanism for Recorder Pens or the Like."

The registering mechanism disclosed herein serves the functions of measuring, indicating and recording, and the term "registering" may be considered as including any one or more of said functions.

The circuitry of the present invention is shown in Figure 2. Commercial power is supplied through main switch 40, the closure of which energizes terminals L1—L2 on amplifier 24. This power is fed to coil 5a of servomotor 5 by closure of switch 41. A stepdown transformer (not shown) in the amplifier 24 supplies power to primary supply terminals P1—P2. Terminal P1 is interconnected to the primary windings 27b of control transformer 27 through conductor 42. Conductor 43 interconnects these primary windings to the movable arm in the upper half of selector switch 32. The primary windings 6b, 7b and 8b of differential transformers 6, 7 and 8 are interconnected to the upper fixed contacts of the selector switch. Depending upon how the switch is thrown, any one of these primary windings is interconnected via conductor 44 to the primary windings 34b of the zeroing transducer 34. The windings 34b are interconnected to terminal P2 via conductor 45.

The terminals S1 and S2 on the amplifier are interconnected to the input of the amplifying stages not shown. Conductor 46 connects terminal S1 to the secondary windings 27c of the control transformer 27, which are in turn connected to the movable arm in the lower part of switch 32 by the conductor 47. The secondary windings 6c, 7c and 8c are interconnected to the fixed contacts in the lower part of the switch. Depending upon which way the switch is thrown, any of the secondary windings may be interconnected via conductor 48 to the secondary windings 34c of zeroing transformer 34. These windings are interconnected to terminal S2 via conductor 49.

The resultant voltage across the secondary windings is amplified by the amplifier and then fed to terminals M1 and M2, which are interconnected to the control phase 5b of servomotor 5.

I claim:

1. In a testing machine having means for mounting and stressing an article, a strain registering system comprising: registering mechanism to denote the strain of the article including a rotatable drum; a cam connected with and synchronously rotatable with said drum; drive mechanism for said drum and said cam including an electric motor having at least two phases and a system for energizing one of said phases comprising a control transducer having an operating portion connected with said article and movable in accordance with the strain of the article and a plurality of transducers selectively connectible in the system each having an operating portion connected with and movable by said cam and switching mechanism for connecting one of said plurality of transducers for operation in the system.

2. In a testing machine having means for mounting and stressing an article, a strain registering system comprising: registering mechanism to denote the strain of the article including a shaft and a rotatable drum mounted on the shaft; a cam connected with said shaft and drive mechanism for said drum including an electric motor connected with said shaft having two phases and a system for energizing one of said phases comprising a differential transformer having a core and a secondary winding, one side of the winding being connected with one side of said one phase, means for connecting the core to said article whereby the core is movable in accordance with the strain of the article when the article is stressed, a plurality of transducers each having a core and a secondary winding, one side of each winding being connected to the other side of said one phase, each of said last cores having connections with said cam providing for movement of the core in accordance with the rotation of the cam, the respective movements of the latter cores being different for a given angular movement of the cam, and a switch for selectively interconnecting the other side of first said secondary winding to any of the other sides of said plurality of secondary windings; and means to effect zeroing of said drum when any of said plurality of transducers is connected in the system.

3. For a testing machine having means for mounting and stressing an article, strain registering apparatus comprising: movable mechanism to denote the strain of the article; a motor for actuating said movable mechanism; gear means interconnecting said motor and said movable mechanism providing for movement thereof; a system for controlling the operation of said motor comprising a first control element developing a voltage for driving the motor in one direction having an actuating portion regulating the voltage developed by the element, said actuating portion being responsive to the strain of the article, and a plurality of control elements operatively selectively connectible in the system for respectively developing voltages for driving the motor in the opposite direction, each having a displaceable actuating portion for regulating the voltage developed by the element; means including a cam interconnecting said movable mechanism and each of the actuating portions of said plurality of control elements whereby the respective displacements of the actuating portions are different for any given angular movement of the cam; and mechanism for selecting one of said plurality of control elements for operation in said system.

4. For a testing machine having means for mounting and stressing an article and having a transducer for developing a voltage, the transducer having an element displaceable in accordance with the strain of the article for regulating said voltage, strain registering apparatus comprising: movable mechanism to denote the strain of the article; a motor for actuating said movable mechanism; means interconnecting said motor and said movable mechanism providing for movement thereof; a system for controlling the operation of said motor comprising means to receive said voltage for driving the motor in one direction, and a plurality of transducers selectively connectible in the system for respectively developing voltages for driving the motor in the opposite direction, each having a displaceable element for regulating the voltage developed; means interconnecting said movable mechanism and each of the displaceable elements of said plurality of transducers whereby the respective displacements of the elements are different for any position of said movable mechanism indicating strain in the article; mechanism for selecting one of said plurality of transducers for operation in the system; and means to effect zeroing of said movable mechanism when any of said plurality of transducers is connected in the system.

5. For a testing machine having means for mounting and stressing an article, strain registering apparatus comprising: movable mechanism to denote the strain of the article; a motor for actuating said movable mechanism; a system for controlling the operation of the motor comprising a first control element developing a voltage for driving the motor, means responsive to the strain in the article to regulate said voltage, a plurality of control elements selectively connectible in said system for respectively developing voltages out of phase with first said voltage for driving the motor, a zeroing control element having a manually adjustable portion for developing a voltage whose phase is shiftable with respect to the phase of first said voltage for driving the motor to zero said movable mechanism, and mechanism connected with said movable mechanism and with said plurality of control elements arranged to differently regulate the voltages of the elements for any given movement of said movable mechanism; and mechanism for selecting one of said plurality of control elements for operation in said system.

6. For a testing machine having means for mounting and stressing an article and having means for developing a voltage including mechanism responsive to the strain in the article to regulate said voltage, strain registering apparatus comprising: movable mechanism to denote the strain of the article; a motor for actuating said movable mechanism; a system for controlling the operation of the motor comprising means to receive said voltage for driving the motor, and a plurality of control elements selectively connectible in said system for respectively developing voltages out of phase with the phase of first said voltage for driving the motor, a zeroing control element having a manually adjustable portion for developing a voltage whose phase is shiftable with respect to the phase of first said voltage for driving the motor to zero said movable mechanism, and mechanism connected with said movable mechanism and with said plurality of control elements arranged to differently regulate the voltages of the elements for any given movement of said movable mechanism; and mechanism for selecting one of said plurality of control elements for operation in said system.

7. For a testing machine having means for mounting and stressing an article, strain registering apparatus comprising: movable mechanism to denote the strain of the article; a motor including a drive shaft for positioning said movable mechanism; a system for controlling the operation of the motor comprising a first control element developing a voltage for driving the motor having an actuating portion regulating the voltage developed by the element, said actuating portion being responsive to the strain of the article, and a plurality of control elements selectively connectible in the system for respectively developing voltages for driving the motor, each having an actuating portion regulating the voltage developed by the element to balance out first said voltage, and a zeroing control element having a manually adjustable portion for developing a voltage for balancing out first said voltage for driving the motor to zero said movable mechanism; means for operating the actuating portions of said plurality of control elements including connections between each actuating portion and the motor drive shaft arranged so that the degree of regulating effect of the actuating portions differs for any given angular movement of the motor drive shaft; and mechanism for selecting one of said plurality of control elements for operation in said system.

8. For a testing machine having means for mounting and stressing an article, strain registering apparatus comprising: registering mechanism to denote the strain of the article including a rotatable drum; a motor including a drive shaft for positioning said drum; a system for controlling the operation of the motor comprising a transducer developing a voltage for driving the motor having a movable element displaceable in accordance with the strain of the article for regulating said voltage, and a plurality of transducers selectively connectible in the system for respectively developing voltages out of phase with first said voltage for driving the motor, each having a displaceable element for regulating the voltage developed; connections between the displaceable elements of each of the plurality of transducers and the motor drive shaft whereby the respective displacements of the elements are different for any given angular movement of the drive shaft; and mechanism for selecting one of said plurality of transducers for operation in said system.

9. A construction in accordance with claim 3 wherein said means interconnecting said movable mechanism and the actuating portions of said control elements further includes a rotatable rod having a plurality of radially extending arms, each arm respectively connected to one of the actuating portions of said plurality of control elements, the points of connection being at different radial distances, and a cam follower connected with the rod adapted to be rotated by movement of said cam whereby to rotate the rod.

10. In a testing machine, a system for registering a change in condition in an article tested comprising: registering mechanism to denote said change in condition; drive mechanism including a motor and a circuit for controlling the operation of the motor comprising a control element for developing a signal for driving the motor in accordance with said change in condition, a plurality of control elements each operatively selectively connectible in the system for developing a signal in opposition to said first signal whereby to stop the operation of the motor and each having an operating portion for regulating the signal thereof connected with and movable by said motor, a zeroing control element for developing a signal in opposition to said first signal for driving the motor to zero said registering mechanism; and mechanism for selecting one of said plurality of control elements for operation.

11. For a testing machine having means for mounting and stressing an article, a strain registering system comprising: rotatable mechanism for indicating the strain of the article; means to rotate said mechanism including a circuit having an element to produce a voltage in accordance with the strain of the article, a plurality of elements selectively connectible in the circuit, each to produce a voltage in opposition to first said voltage; and voltage regulating means connected between said plurality of elements and said rotatable mechanism operable in accordance with rotation of said rotatable mechanism to affect the voltages of said plurality of elements so that the amount of rotation of said mechanism depends upon which of said elements is connected in the system whereby a given indication of strain can be amplified.

References Cited in the file of this patent

UNITED STATES PATENTS

| | | |
|---|---|---|
| 1,122,239 | John | Dec. 22, 1914 |
| 2,061,383 | Lewis | Nov. 17, 1936 |
| 2,212,085 | Tate | Aug. 20, 1940 |
| 2,317,807 | Ryder | Apr. 27, 1943 |
| 2,352,953 | Haight | July 4, 1944 |
| 2,367,746 | Williams | Jan. 23, 1945 |
| 2,486,357 | Gilbert | Oct. 25, 1949 |
| 2,543,950 | Yardeny et al. | Mar. 6, 1951 |
| 2,615,936 | Glass | Oct. 28, 1952 |
| 2,630,007 | Have et al. | Mar. 3, 1953 |
| 2,637,619 | Stein | May 5, 1953 |